(12) United States Patent
Dobashi (10) Patent No.: US 11,895,421 B2
(45) Date of Patent: Feb. 6, 2024

(54) APPARATUS, METHOD, AND STORAGE MEDIUM FOR CONTROLLING FOCUS POINT ADJUSTMENT OPERATION

(71) Applicant: CANON KABUSHIKI KAISHA, Tokyo (JP)

(72) Inventor: Toshiyuki Dobashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/353,120

(22) Filed: Jun. 21, 2021

(65) Prior Publication Data

US 2021/0409636 A1 Dec. 30, 2021

(30) Foreign Application Priority Data

Jun. 29, 2020 (JP) .................. 2020-111994

(51) Int. Cl.
*H04N 25/772* (2023.01)
*H04N 23/67* (2023.01)
*H04N 23/80* (2023.01)

(52) U.S. Cl.
CPC .......... *H04N 25/772* (2023.01); *H04N 23/67* (2023.01); *H04N 23/80* (2023.01)

(58) Field of Classification Search
CPC ........... H04N 5/37455; H04N 5/23212; H04N 5/23229; H04N 5/232123; H04N 5/36961; H04N 5/3575; H04N 5/232122; H04N 23/61; H04N 23/67; H04N 23/80; H04N 25/772

See application file for complete search history.

(56) References Cited

U.S. PATENT DOCUMENTS

2009/0115887 A1 5/2009 Sugimoto
2016/0227101 A1 8/2016 Iwasaki

FOREIGN PATENT DOCUMENTS

JP 2006301005 A 11/2006
JP 4876836 B2 * 2/2012

* cited by examiner

*Primary Examiner* — Antoinette T Spinks
(74) *Attorney, Agent, or Firm* — CANON U.S.A., INC. IP Division

(57) ABSTRACT

According to an aspect of the present invention, a control apparatus to control focal point adjustment operation of an imaging optical system includes a calculation unit configured to calculate a focal point evaluation value for each of images captured successively by the imaging optical system, a determination unit configured to determine whether an amount of change in the focal point evaluation value calculated by the calculation unit with respect to a reference value is greater than or equal to a threshold, and a control unit configured to control the focal point adjustment operation of the imaging optical system to be executed in a case where a number of times the amount of change is determined to be greater than or equal to the threshold by the determination unit is greater than or equal to a first value.

6 Claims, 11 Drawing Sheets

APPARATUS, METHOD, AND STORAGE MEDIUM FOR CONTROLLING FOCUS POINT ADJUSTMENT OPERATION

BACKGROUND

Field of the Disclosure

The present invention relates to control apparatuses, methods, and storage media.

Description of the Related Art

There is a known technique of setting a time interval of reactivation and an amount of change in focal point evaluation value with respect to a reference in reactivation, based on imaging conditions, camera statuses, and other conditions, when repeating focusing operation (Japanese Patent Application Laid-Open No. 2006-301005).

SUMMARY

According to an aspect of the present invention, a control apparatus to control focal point adjustment operation of an imaging optical system includes a calculation unit configured to calculate a focal point evaluation value for each of images captured successively by the imaging optical system, a determination unit configured to determine whether an amount of change in the focal point evaluation value calculated by the calculation unit with respect to a reference value is greater than or equal to a threshold, and a control unit configured to control the focal point adjustment operation of the imaging optical system to be executed in a case where a number of times the amount of change is determined to be greater than or equal to the threshold by the determination unit is greater than or equal to a first value.

Further features of the present invention will become apparent from the following description of exemplary embodiments with reference to the attached drawings.

DESCRIPTION OF THE EMBODIMENTS

Some exemplary embodiments of the present invention will be described in detail below with reference to the drawings.

Figure 1:
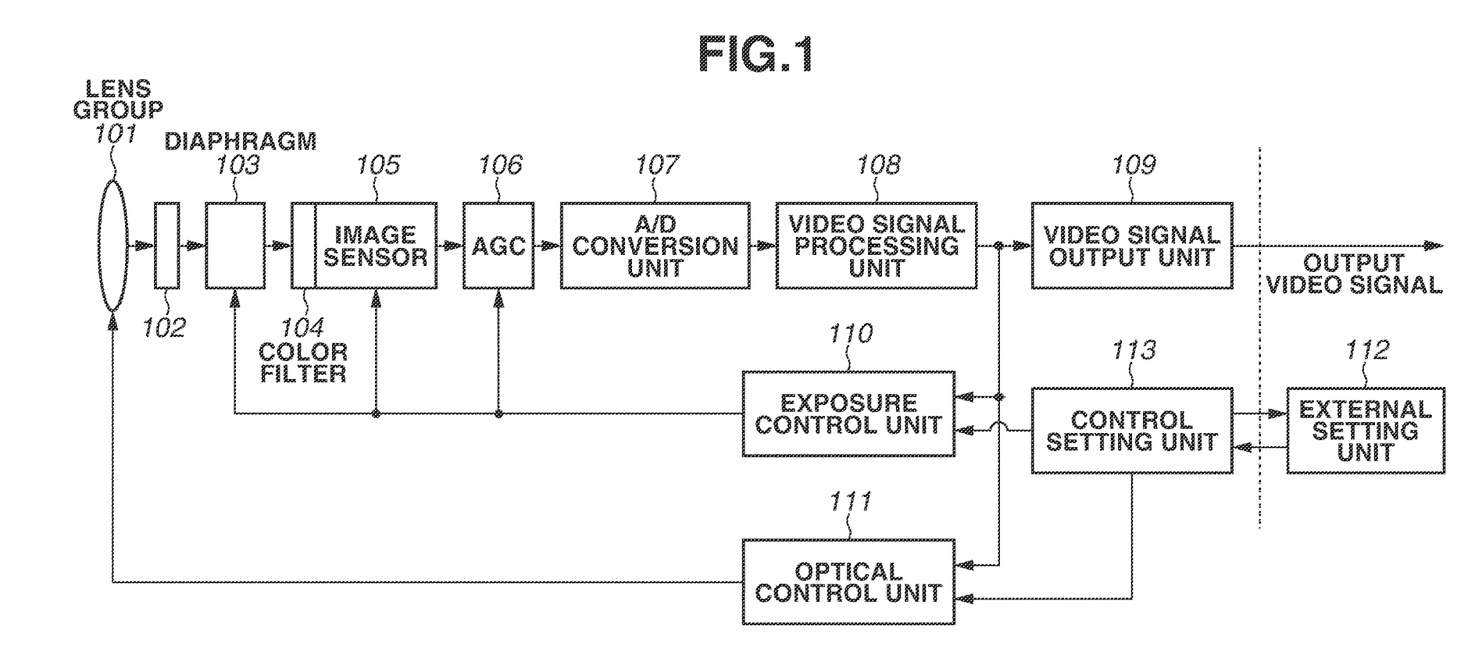
FIG. 1 is a diagram illustrating a functional configuration.

FIG. 1 is a diagram illustrating a functional configuration of a control apparatus (an imaging apparatus) according to a first exemplary embodiment.

Light that has passed through a lens group 101 (an imaging optical system) is incident on an image sensor 105, via an optical filter 102, a diaphragm 103, and a color filter 104.

The lens group 101 is an optical system that condenses incident light from an object on the image sensor 105. The lens group 101 includes a focus lens for bringing an object into focus, and a zoom lens for adjusting the angle of view.

For example, an infrared cut filter (IRCF) is disposed as the optical filter 102.

The diaphragm 103 adjusts the quantity of the light to be incident on the image sensor 105 through the lens group 101 and the optical filter 102.

The color filter 104 is disposed at each pixel of the light receiving surface of the image sensor 105 in predetermined order.

The image sensor 105 outputs captured-image information about an imaging target in an analog signal. Here, the image sensor 105 performs imaging and frame output a predetermined number of times per second (at a frame rate) successively.

A video image formed in the image sensor 105 undergoes gain control in an automatic gain controller (AGC) 106. Subsequently, an analog-to-digital (A/D) conversion unit 107 converts the analog imaging signal into digital imaging signals.

A video signal processing unit 108 performs predetermined processing on the digital imaging signals from the A/D conversion unit 107, and outputs a luminance signal and a color signal for each pixel. Further, the video signal processing unit 108 generates a video for output and generates parameters for camera control.

Here, the parameters for camera control include a parameter for aperture control, a focal point evaluation value (an automatic focus (AF) evaluation value) as a frequency component value for focusing (focusing operation), and a parameter to be used in white balance control for adjusting tint. These parameters are generated for each frame.

A video signal output unit 109 outputs the video signal generated by the video signal processing unit 108 to the outside.

An exposure control unit 110 calculates the luminance information in an imaging screen, based on the luminance information output from the video signal processing unit 108. Subsequently, the exposure control unit 110 controls the diaphragm 103 and the AGC 106 to adjust the captured image to appropriate brightness. The brightness is also adjustable according to the storage time of the image sensor 105 adjusted by the shutter speed.

The focusing operation in the present exemplary embodiment involves the calculation of a contrast value or a high frequency component intensity from the video signal generated by the video signal processing unit 108, to use them as the focal point evaluation value. An optical control unit 111 controls the lens group 101 to be at a position (an in-focus position) for maximizing the focal point evaluation value, which is a so-called contrast AF system.

An external setting unit 112 is used for typical camera operations including focusing, brightness designation, and zooming factor designation.

A control setting unit 113 sets camera control commands transmitted from the external setting unit 112, and makes settings for exposure control, lens control, and the like. In one or more embodiments, the above-described functions referred to by the reference numerals 108 to 113 are included in an apparatus connected to the imaging apparatus via a network.

A procedure of processing of the present exemplary embodiment will be described with reference to a flowchart illustrated in FIG. 2.

Figure 2:
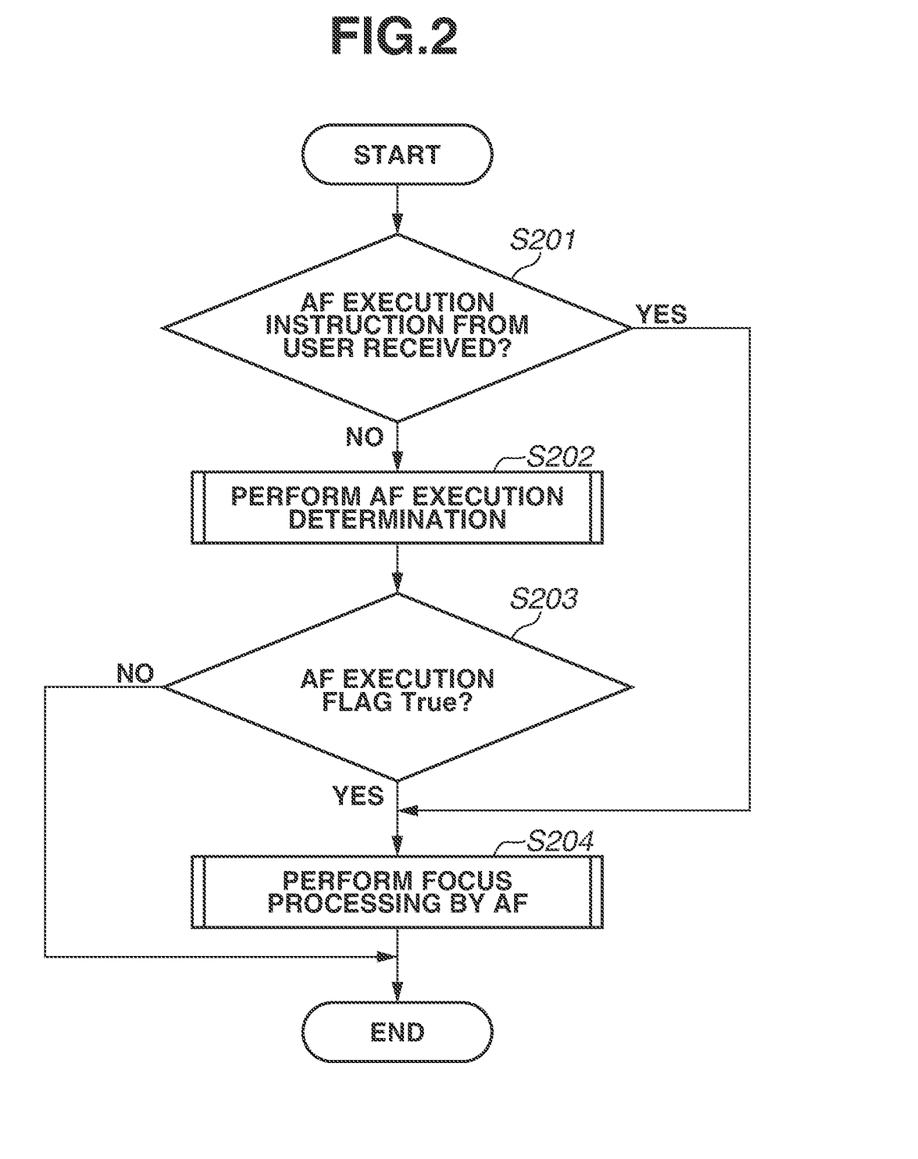
FIG. 2 is a flowchart illustrating a series of steps of AF processing according to a first exemplary embodiment.

Here, the processing in FIG. 2 is executed each time the focal point evaluation value is generated by the video signal processing unit 108.

In step S201, the optical control unit 111 determines whether an AF execution instruction issued by a user at the external setting unit 112 is received, via the control setting unit 113. If the instruction is received (YES in step S201), the processing proceeds to step S204. Otherwise (NO in step S201), the processing proceeds to step S202.

In step S202, the optical control unit 111 performs processing of determining whether to execute AF processing (i.e., AF execution determination processing). The details of this processing will be described below.

In step S203, the optical control unit 111 determines whether an AF execution flag for issuing an instruction to perform the AF execution is True, based on the result of the processing in step S202. If the AF execution flag is True (YES in step S203), the processing proceeds to step S204. Otherwise (NO in step S203), this processing ends.

In step S204, the optical control unit 111 performs focus processing by AF.

Figure 3:
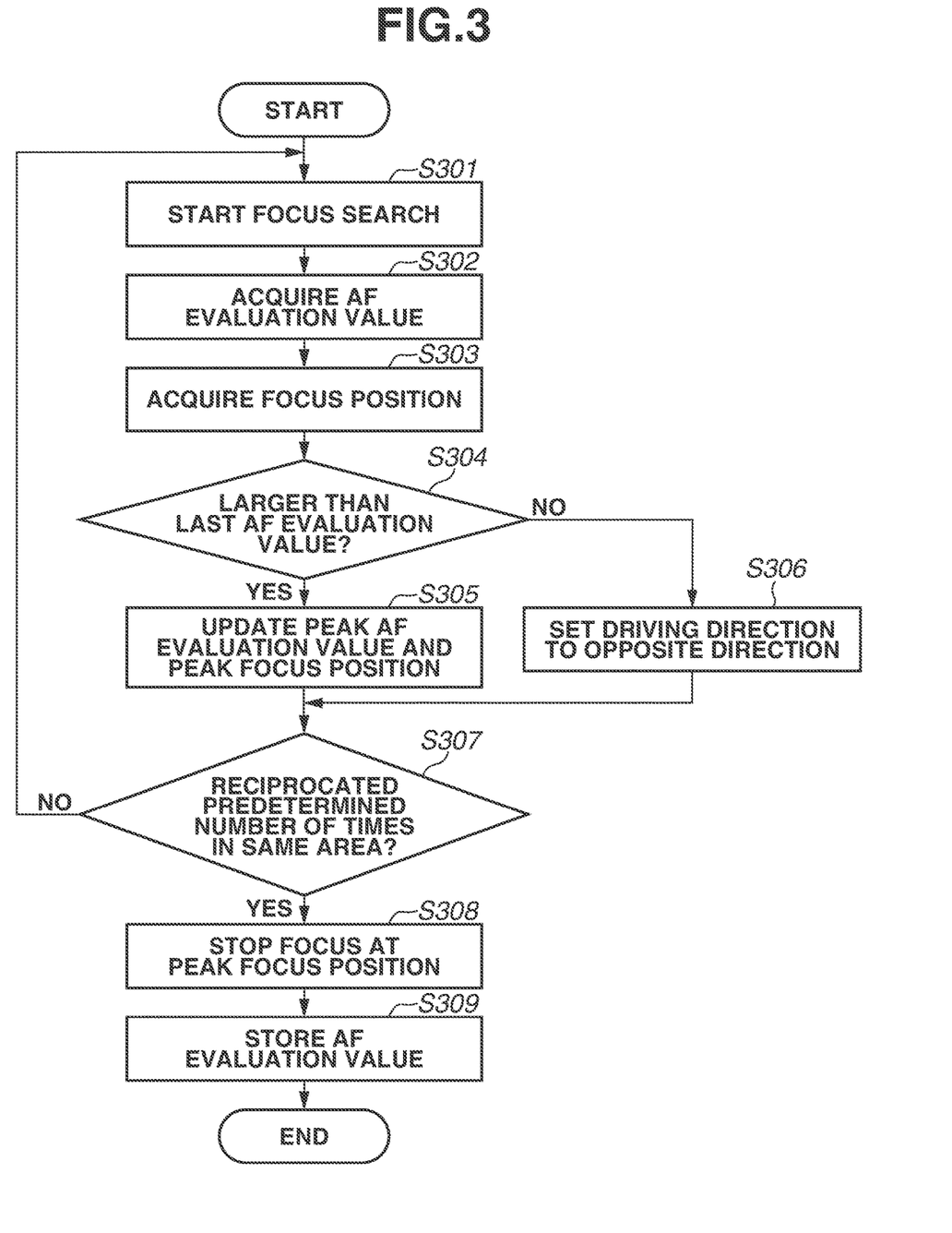
FIG. 3 is a flowchart illustrating focus processing in automatic focus (AF) according to the first exemplary embodiment.

Here, the details of the processing in step S204 will be described with reference to a flowchart illustrated in FIG. 3.

First, in step S301, the optical control unit 111 starts a focus search operation. In the focus search operation, while driving the focus lens of the lens group 101 in a predetermined direction (the closest direction or infinite distance direction), the optical control unit 111 acquires the focal point evaluation value in step S302 and the position of the focus lens (hereinafter, the focus position) in step S303.

In step S304, the optical control unit 111 determines whether the focal point evaluation value acquired in step S302 is greater than the focal point evaluation value acquired last time. If greater (YES in step S304), the processing proceeds to step S305. Otherwise (NO in step S304), the processing proceeds to step S306.

In step S305, the optical control unit 111 updates the peak value of the focal point evaluation value. Specifically, if the current focal point evaluation value is larger than the peak focal point evaluation value (a focal point evaluation value stored as the peak value), the current focal point evaluation value is set (stored) as the peak focal point evaluation value. Further, the current focus position is set (stored) as the peak focus position (the focus lens position corresponding to the peak value of the focal point evaluation value).

In step S306, the optical control unit 111 sets the lens driving direction in the focus search operation to the direction opposite to the current direction. In other words, if the optical control unit 111 drives the lens in the closest direction currently, the optical control unit 111 sets the lens driving direction to the infinite distance direction; otherwise, the optical control unit 111 sets the lens driving direction currently in the infinite value direction to the closest direction.

If the focal point evaluation value increases during the current focus search, the optical control unit 111 updates the peak value without changing the driving direction of the focus lens, based on the assumption that a focus position will be in the current driving direction. On the other hand, if the focal point evaluation value becomes smaller than the last focal point evaluation value, the optical control unit 111 determines that the focus lens has moved away from the focus position, and then drives the focus lens in the direction opposite to the current moving direction.

In step S307, the optical control unit 111 determines whether the focus lens has reciprocated a predetermined number of times or more in the same area (the focus position). If the focus lens has reciprocated the predetermined number of times or more (YES in step S307), the processing proceeds to step S308. Otherwise (NO in step S307), the processing returns to step S301 to continue the focus search. This determination is based on the assumption that the stay of the focus lens within the same driving range means that an in-focus position will be in the range.

In step S308, the optical control unit 111 drives the focus lens to the peak focus position set in step S305, and then stops the focus lens (focus stop).

In step S309, the optical control unit 111 stores the current focal point evaluation value as the focal point evaluation value at the focus stop, and this processing ends. This focal point evaluation value (AF evaluation value) is to be used in the AF execution determination processing in step S202 to be described below.

Figure 4:
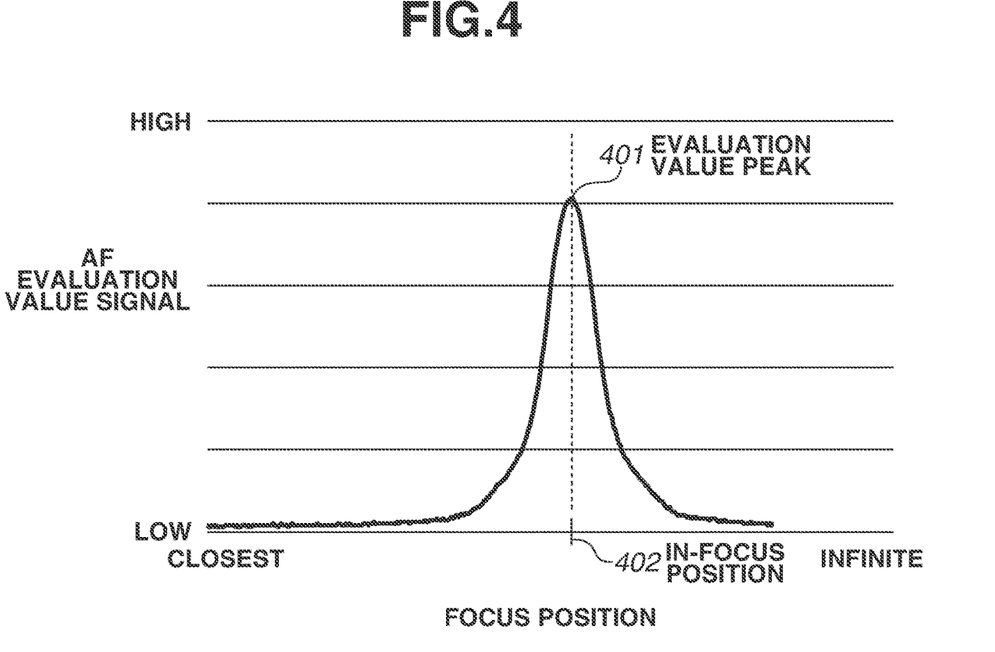
FIG. 4 is a graph illustrating an example of focal point evaluation value according to the first exemplary embodiment.

FIG. 4 illustrates the relationship between focal point evaluation values and focus positions. At the end of a series of steps in the processing in FIG. 3, the focus lens stops at the position (an in-focus position 402) of the peak focal point evaluation value (an evaluation value peak 401).

Figure 5:
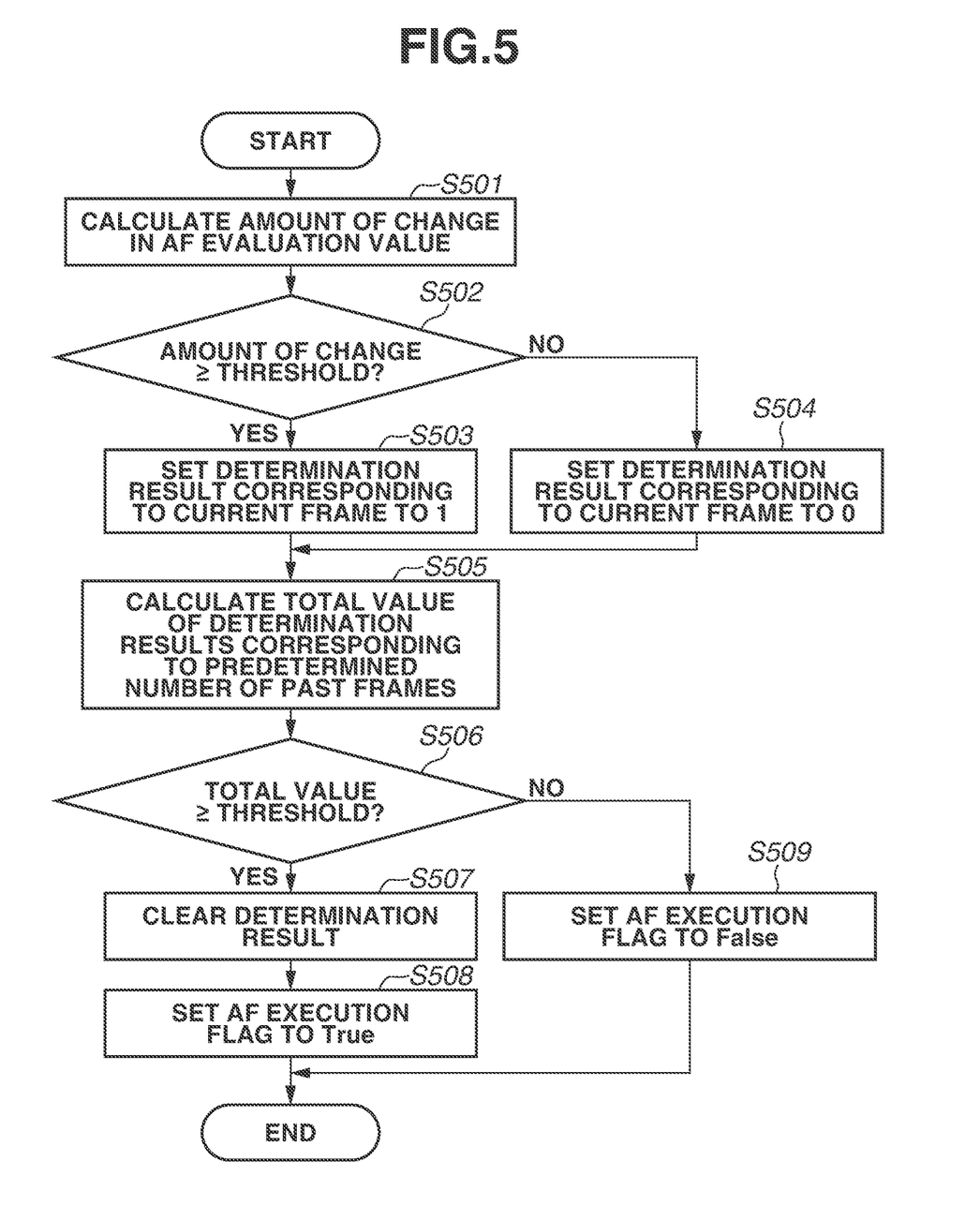
FIG. 5 is a flowchart illustrating AF execution determination processing according to the first exemplary embodiment.

Next, the processing in step S202 will be described with reference to a flowchart illustrated in FIG. 5.

In step S501, the optical control unit 111 calculates an amount of change in the focal point evaluation value. The amount of change is an absolute value difference between the focal point evaluation value (reference value) at the focus stop stored in step S309 and the focal point evaluation value of the current frame.

In step S502, the optical control unit 111 determines whether the amount of change in the focal point evaluation value calculated in step S501 is greater than or equal to a threshold. If the amount of change is greater than or equal to the threshold (YES in step S502), the processing proceeds to step S503. Otherwise (NO in step S502), the processing proceeds to step S504. The threshold is a value for adjusting sensitivity to an object change. With the threshold set to a low value, a response to even a slight object change easily occurs, but a response to disturbance such as noise can also occur. On the other hand, with the threshold set to a high value, a response to disturbance such as noise does not easily occur, but a response to an object change can be weak. Thus, it is suitable to adjust the threshold beforehand based on actual imaging scenes.

The processing in step S503 and step S504 is processing of accumulating the results of the determination in step S502. In this processing, the optical control unit 111 holds the results of the determination for the latest predetermined number of past frames, using a buffer that stores the result of the determination for each of the past frames.

In step S503, the optical control unit 111 sets the result of the determination corresponding to the current frame to 1.

In step S504, the optical control unit 111 sets the result of the determination corresponding to the current frame to 0.

In step S505, the optical control unit 111 calculates the total value of the results of the determination for the latest predetermined number of past frames.

In step S506, the optical control unit 111 determines whether the total value calculated in step S505 is greater than or equal to a threshold (a first value/AF execution threshold). If the total value is greater than or equal to the threshold (YES in step S506), the processing proceeds to step S507. Otherwise (NO in step S506), the processing proceeds to step S509. The threshold (the first value) in step S506 is a parameter for controlling the responsiveness that is the time interval between the occurrence of the object change and the AF execution. With the threshold (the first value) set to a high value, a response to a temporary object change due to, for example, a person cutting across in front of the object is reduced, but the responsiveness is low accordingly. With the threshold set a low value, the responsiveness is increased, but a response to a temporary object change can also easily occur. Thus, it is suitable that the threshold (the first value) is set based on imaging scenes.

In step S505, the optical control unit 111 also sets the predetermined number of frames (a second value) to calculate the total value in association with the threshold (the first value) to satisfy the threshold≤the number of predetermined frames.

A specific setting example is as follows.

First, the optical control unit 111 determines the threshold (the first value/AF execution threshold) to achieve an appropriate responsiveness. For example, for the occurrence of a response to an object change in one second, the optical control unit 111 sets the threshold to 60 frames for an imaging apparatus with a frame rate of 60 fps. This is because a frame rate of 60 fps means that the time per frame is 1/60 seconds.

Next, the optical control unit 111 sets the predetermined number of frames to a value higher than or equal to the threshold. For example, with the predetermined number of frames set to 60, which is the same as the threshold, the AF operation (focal point adjustment operation) is executed (started) only when the change in the focal point evaluation value of each of all the 60 frames is greater than or equal to the threshold of the focal point evaluation value in step S502.

The focal point evaluation value is sensitive to noise in an image or the like. That causes the AF operation to be executed fewer times in the environment where noise is easily generated at a high gain such as low illuminance imaging. This is because the focal point evaluation value based on an object change to which a response is supposed to occur becomes closer to focal point evaluation values based on noise, and reducing the amount of change in the total focal point evaluation value. Such a case therefore is less likely to occur with the predetermined number of frames set to a value larger than the threshold. In other words, the predetermined number of frames to be set depends on how much noise affecting the focal point evaluation value is acceptable. For example, the relationship between the predetermined number of frames and the threshold is determined based on amounts of noise in images.

In step S507, the optical control unit 111 clears (deletes) the buffer for storing the result of the determination.

In step S508, the optical control unit 111 sets the AF execution flag for issuing an instruction to execute (start) the AF operation to True, and this processing ends.

In step S509, the optical control unit 111 sets the AF execution flag to False, and this processing ends.

Figure 8A:
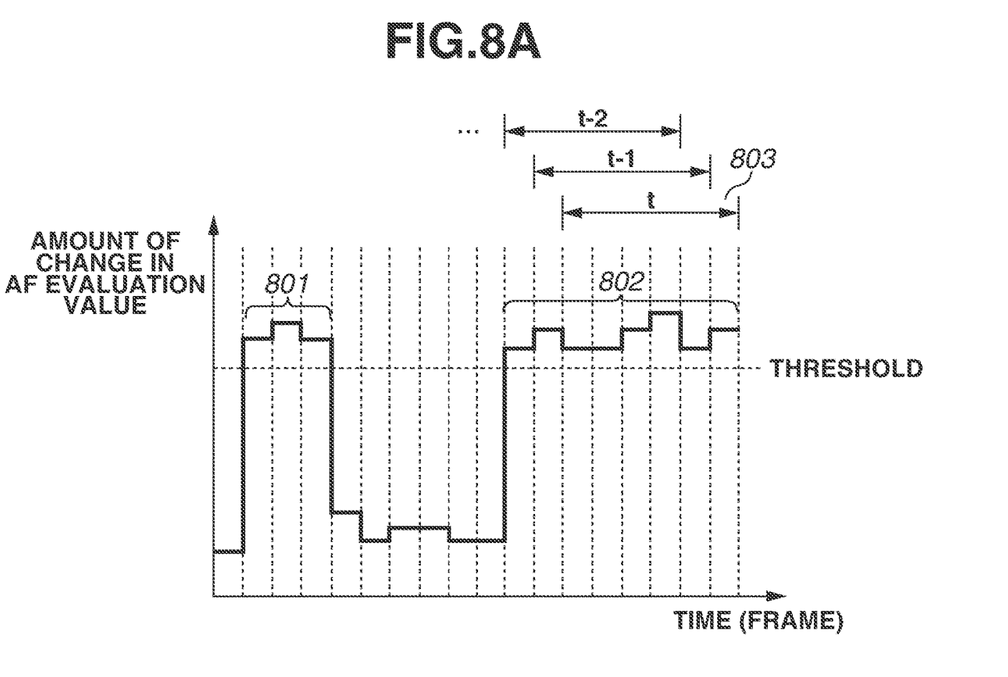
FIGS. 8A and 8B are diagrams illustrating change in focal point evaluation value according to the first exemplary embodiment.
Figure 8B:
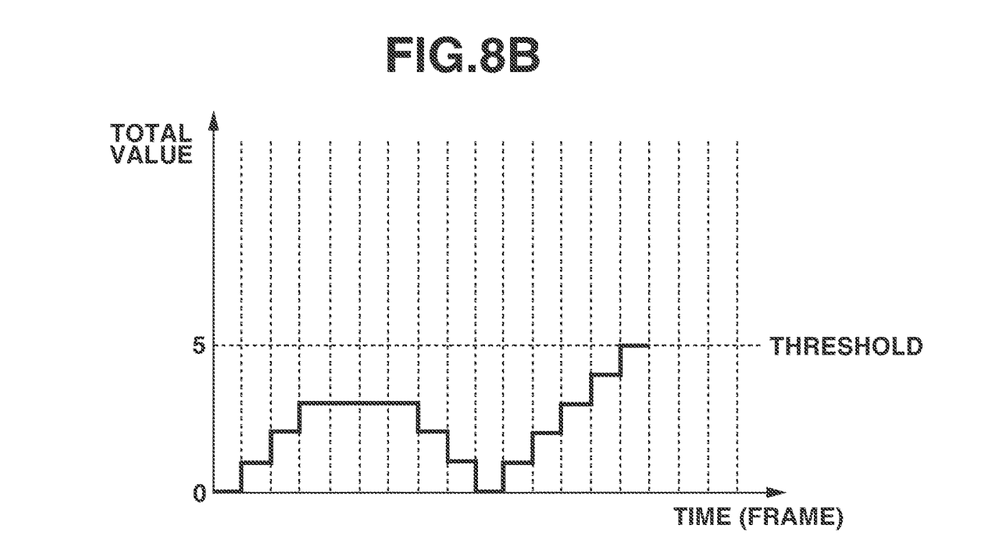

FIG. 8A exemplifies change in the focal point evaluation value in the present exemplary embodiment. FIG. 8B exemplifies the change in the total value calculated in step S505. In this example, the predetermined number of frames for calculating the total value are 6 frames (frames 803), and the threshold (the first value/AF execution threshold) in step S506 is set to 5. In other words, with the amounts of change in the focal point evaluation values of 5 frames out of the 6 frames larger than the threshold, the AF operation is executed. Further, a fixed frame rate (fps) means a fixed time per frame. With a fixed frame rate, the predetermined number of frames corresponds to a predetermined time. For example, if the frame rate is 50 fps, the time per frame is 1/50 seconds=20 milliseconds. Hence, the above-described 5 frames out of the 6 frames means 100 milliseconds of the 120 milliseconds. The AF operation is therefore executed when the focal point evaluation value exceeds the threshold of the predetermined time (period).

A temporary object change due to, for example, a person cutting across in front of the object causes the amount of change in the focal point evaluation value to go high temporarily, as indicated by a section 801. As illustrated in FIG. 8B, such a temporary object change however does not bring the total value to the threshold, which does not initiate the AF execution. On the other hand, continuous object change produces continuous high amounts of change in the focal point evaluation value, as indicated by a section 802. In this case, the total value exceeds the threshold, initiating the AF execution.

As described above, according to the present exemplary embodiment, the AF execution is determined in consideration of the changes in the past focal point evaluation values, reducing a response to a temporary object change due to, for example, a person cutting across in front of the object. As a result, this configuration reduces blurs on video images or variations in angle of view due to an extra AF execution.

A second exemplary embodiment will be described. In the first exemplary embodiment, a method has been described of storing the results of the determination for the past frames for the predetermined number of frames, calculating the total value each time the results are stored, and determining the AF execution based on the calculated total value. In the second exemplary embodiment, the AF execution is determined in a simpler way without storing the determination results for the past frames or calculating the total value.

Figure 6:
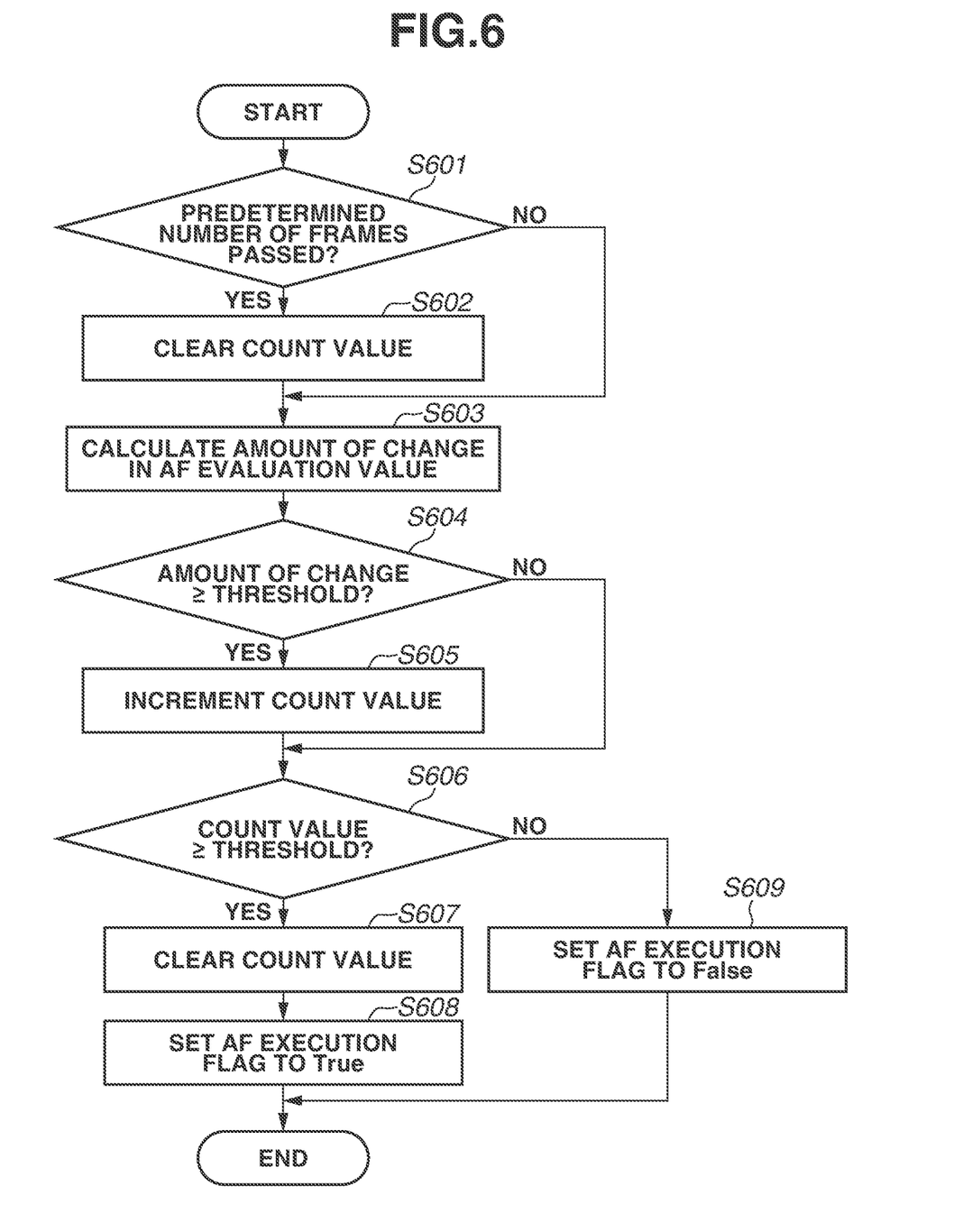
FIG. 6 is a flowchart illustrating AF execution determination processing according to a second exemplary embodiment.

AF execution determination processing according to the present exemplary embodiment will be described with reference to a flowchart illustrated in FIG. 6. The timing of starting the processing is similar to that in the first exemplary embodiment and thus the redundant description will not be omitted.

In step S601, the optical control unit 111 determines whether a predetermined number of frames have passed. The number of frames having passed is calculated based on the frame determined to have passed in step S601 last time. If the predetermined number of frames have passed (YES in step S601), the processing proceeds to step S602. Otherwise (NO in step S601), the processing proceeds to step S603. At the time of the initial execution, the result of the determination in step S601 is YES.

In step S602, the optical control unit 111 clears the count value. The count value will be described in detail below.

In step S603, the optical control unit 111 calculates the amount of change in the focal point evaluation value. The calculation method is similar to that in step S501 in the first exemplary embodiment.

In step S604, the optical control unit 111 determines whether the amount of change in the focal point evaluation value calculated in step S603 is greater than or equal to a threshold (a count threshold). The determination method is similar to that in step S502 in the first exemplary embodiment. If the optical control unit 111 determines that the amount of change is greater than or equal to the threshold (YES in step S604), the processing proceeds to step S605. Otherwise (NO in step S604), the processing proceeds to step S606.

In step S605, the optical control unit 111 increments the count value indicating the occurrence of a change in the focal point evaluation value, i.e., an object change.

In step S606, the optical control unit 111 determines whether the count value is greater than or equal to the threshold (the first value/AF execution threshold). If the count value is greater than or equal to the threshold (YES in step S606), the processing proceeds to step S607. Otherwise (NO in step S606), the processing proceeds to step S609.

In step S607, the optical control unit 111 clears the count value.

In step S608, the optical control unit 111 sets the AF execution flag for issuing an instruction to perform the AF execution to True, and this processing ends.

In step S609, the optical control unit 111 sets the AF execution flag for issuing an instruction to perform the AF execution to False, and this processing ends.

The predetermined number of frames in step S601 and the threshold in step S604 can each be set in a manner similar to that in the first exemplary embodiment.

Figure 9A:
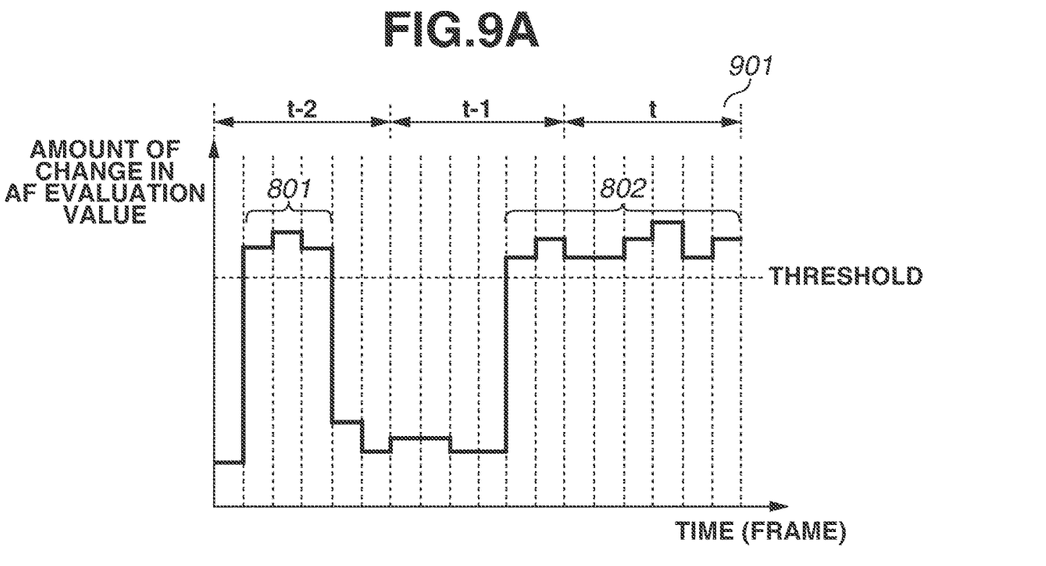
FIGS. 9A and 9B are diagrams illustrating change in focal point evaluation value according to the second exemplary embodiment.
Figure 9B:
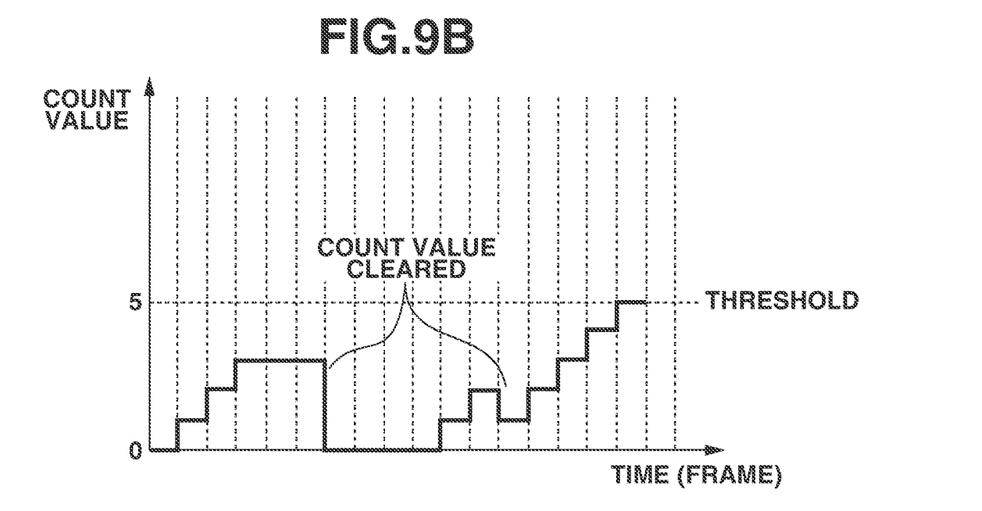

FIG. 9A exemplifies change in the focal point evaluation value in the present exemplary embodiment. FIG. 9B exemplifies change in the count value calculated in step S605. In this example, the predetermined number of frames (the second value) for clearing (deleting) the count value are 6 frames (frames 901), and the threshold (the first value) in step S606 is set to 5. As with the first exemplary embodiment, a temporary object change due to, for example, a person cutting across in front of the object produces temporary high amounts of change in the focal point evaluation value, as indicated by a section 801. In this case, as illustrated in FIG. 9B, the count value does not reach a threshold of 6 frames for clearing the count value, which does not initiate the AF execution. On the other hand, continuous object change produces continuous high amounts of change in the focal point evaluation value, as indicated by a section 802. In this case, the count value in FIG. 9B exceeds the threshold, initiating the AF execution.

As described above, according to the present exemplary embodiment, without the operations of storing the determination result corresponding to each of the past frames and of calculating the total value, the AF execution is determined in a simple way as compared with the first exemplary embodiment.

A third exemplary embodiment will be described. In the second exemplary embodiment, a simple method has been described of incrementing the count value each time an object change is detected and performing the AF execution determination comparing the count value with the threshold. However, clearing the count value each time the predetermined number of frames have passed can cause a delay in the AF execution depending on the timing of an object change. For example, if the count value is cleared in response to the reach of the predetermined number of frames even though the count value is incremented due to detection of continuous object change, the AF execution can be delayed.

In the third exemplary embodiment, a method will be described of reducing this delay in simple processing as with the second exemplary embodiment.

Figure 7:
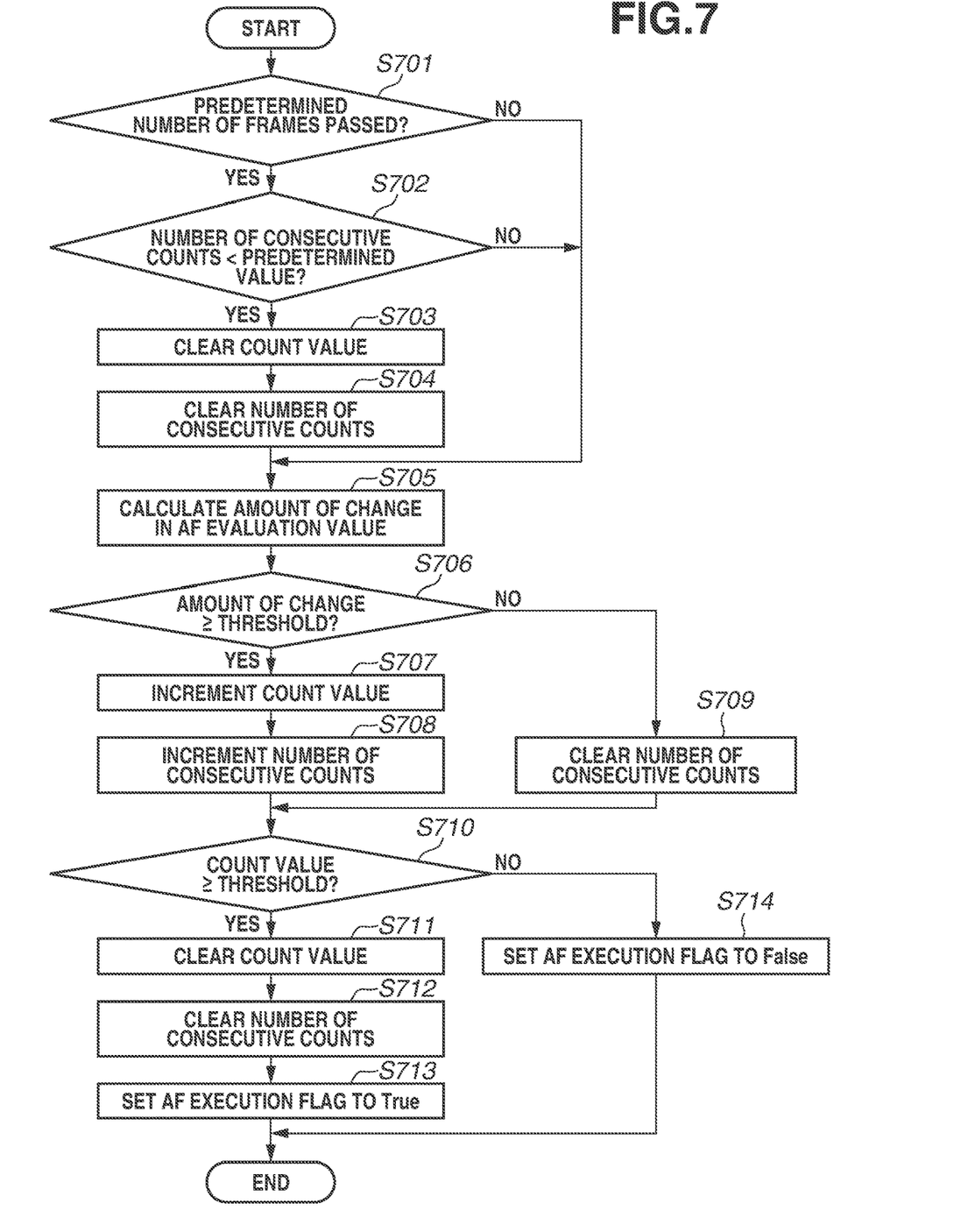
FIG. 7 is a flowchart illustrating AF execution determination processing according to a third exemplary embodiment.

FIG. 7 is a flowchart of the present exemplary embodiment. AF execution determination processing according to the present exemplary embodiment will be described with reference to the flowchart in FIG. 7. Processing in steps similar to those in the above-described exemplary embodiments will not be described.

In step S702, the optical control unit 111 determines whether the number of consecutive counts to be described below is less than a predetermined value. If the number of consecutive counts is less than the predetermined value (YES in step S702), the processing proceeds to step S703. Otherwise (NO in step S702) the processing proceeds to step S705.

In step S704, the optical control unit 111 clears the number of consecutive counts.

In step S708, the optical control unit 111 increments the number of consecutive counts indicating that a change in the focal point evaluation value, i.e., object change, is continuously detected.

In step S709, the optical control unit 111 clears the number of consecutive counts.

In step S712, the optical control unit 111 clears the number of consecutive counts.

Figure 10A:
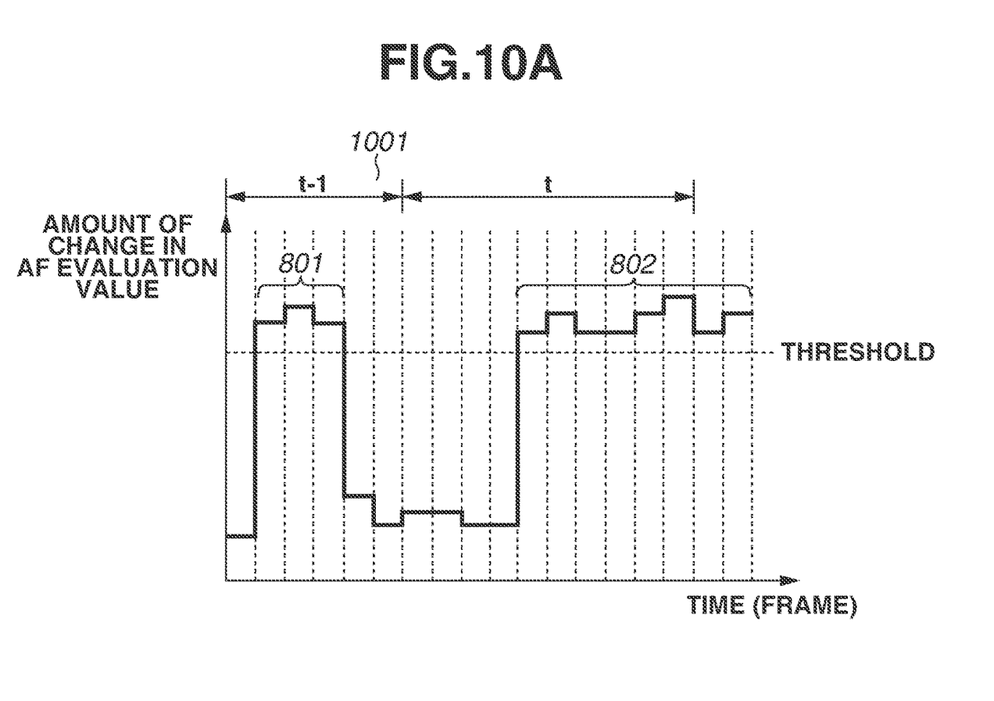
FIGS. 10A and 10B are diagrams illustrating change in focal point evaluation value according to the third exemplary embodiment.
Figure 10B:
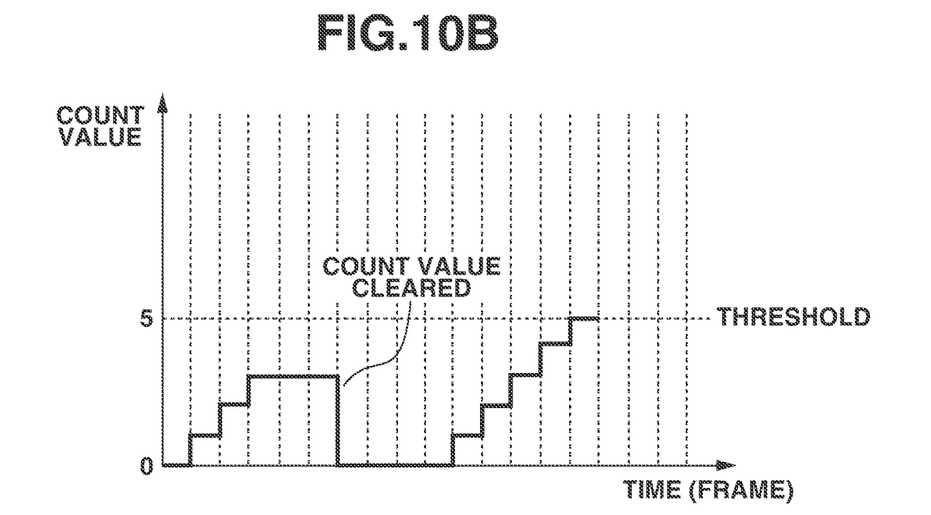

FIG. 10A exemplifies change of the focal point evaluation value in the present exemplary embodiment. FIG. 10B exemplifies the change of the count value calculated in step S707. In this example, the predetermined number of frames for clearing the count value (the second value) are 6 frames (frames 1001), and the threshold (the first value) in step S710 is set to 5. Further, the predetermined value of the number of consecutive counts in step S702 is set to 1. As with the first exemplary embodiment, as a temporary object change due to, for example, a person cutting across in front of the object occurs, the amount of change in the focal point evaluation value becomes high temporarily, as indicated by a section 801. In this case, as illustrated in FIG. 10B, the count value does not reach the threshold, not initiating the AF execution. On the other hand, as continuous object change appears, the amount of change in the focal point evaluation values stays high continuously, as indicated by a section 802. In this case, the count value in FIG. 10B exceeds the threshold, initiating the AF execution. Further, although the count value is cleared twice in the example described with reference to FIG. 9B of the second exemplary embodiment, the second clearing of the count value is not performed in this example. This is because the number of consecutive counts at that time exceeds 1. As a result, the threshold is reached faster and the AF operation is thereby executed earlier than in the example of the second exemplary embodiment.

According to the above-described processing, with the number of continuous counts greater than or equal to the predetermined value, i.e., as continuous object change is detected, the count value is not cleared in step S703 (the count value is maintained). This reduces the delay in the AF execution of the second exemplary embodiment.

Other Exemplary Embodiments

The present invention can also be implemented by processing for supplying a program for implementing one or more functions in the above-described exemplary embodiments to a system or apparatus via a network or a storage medium and causing one or more processors in a computer of the system or apparatus to read and execute the program. The present invention can also be implemented by a circuit that implements one or more functions (for example, an application specific integrated circuit (ASIC)).

Figure 11:
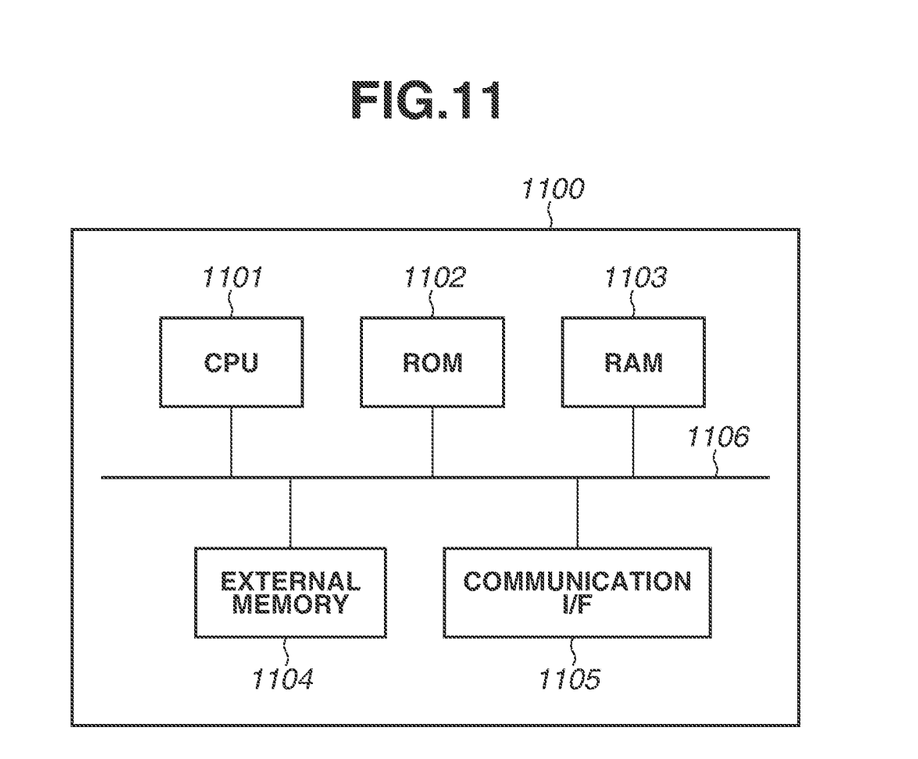
FIG. 11 is a diagram illustrating a hardware configuration of a control apparatus according to each of the exemplary embodiments.

FIG. 11 is a block diagram illustrating a hardware configuration example of a computer to execute the processing according to each of the above-described exemplary embodiments using a program.

A control apparatus 1100 includes a central processing unit (CPU) 1101, a read only memory (ROM) 1102, a random access memory (RAM) 1103, an external memory 1104, a communication interface (I/F) 1105, and a system bus 1106.

The CPU 1101 generally controls operations in the control apparatus 1100, and controls each component (the ROM 1102, the RAM 1103, the external memory 1104, and the communication I/F 1105) via the system bus 1106.

The ROM 1102 is a nonvolatile memory to store control programs for the CPU 1101 to execute processing. In one or more embodiments, these programs are stored in the external memory 1104 or in a removable storage medium.

The RAM 1103 functions as a main memory, a work area, or the like of the CPU 1101. In other words, the CPU 1101 loads a program for executing the processing from the ROM 1102 into the RAM 1103, and runs the loaded program, thereby implementing various kinds of functional operation.

The external memory 1104 stores, for example, various types of data and various kinds of information for the CPU 1101 to execute processing using programs. The external memory 1104 also stores, for example, various types of data and various kinds of information obtained by the execution of processing by the CPU 1101 using programs.

The communication I/F 1105 is an interface for communicating with an external apparatus. The communication I/F 1105 is, for example, a local area network (LAN) interface.

The system bus 1106 connects the CPU 1101, the ROM 1102, the RAM 1103, the external memory 1104, and the communication I/F 1105 communicably.

The above-described exemplary embodiments of the present invention is not limiting the present invention, and various alterations and modifications can be made within the scope of the gist thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-111994, filed Jun. 29, 2020, which is hereby incorporated by reference herein in its entirety.

What is claimed is:

1. A control apparatus to control focal point adjustment operation of an imaging optical system, the control apparatus comprising:
   at least one processor;
   a memory coupled to the at least one processor, the memory storing instructions that, when executed by the processor, cause the processor to function as:
   a calculation unit configured to calculate a focal point evaluation value for each of images captured successively by the imaging optical system;
   a determination unit configured to determine whether an amount of change in the focal point evaluation value calculated by the calculation unit with respect to a reference value is greater than or equal to a first threshold;
   a first count unit configured to count a number of times the determination unit determines that the amount of change in the focal point evaluation value is greater than or equal to the threshold;
   a second count unit configured to count a number of frames;
   a storage unit configured to store the number of times counted by the first count unit, wherein the number of times counted by the first count unit is reset in a case where the number of frames counted by the second count unit is greater than or equal to a second threshold; and
   a control unit configured to control the imaging optical system so that the focal point adjustment operation is executed in a case where the number of times counted by the first count unit is greater than or equal to a third threshold before the number of frames counted by the second count unit is greater than or equal to the second threshold.

2. The control apparatus according to claim 1, wherein the reference value is a focal point evaluation value in a state where a predetermined object is in focus.

3. A method of controlling focal point adjustment operation of an imaging optical system, the method comprising:
   calculating a focal point evaluation value for each of images captured successively by the imaging optical system;
   determining whether an amount of change in the calculated focal point evaluation value with respect to a reference value is greater than or equal to a first threshold;
   counting a number of times the amount of change in the focal point evaluation value is determined to be greater than or equal to the first threshold;
   counting a number of frames;

storing the number of times wherein the number of times is reset in a case where the number of frames counted by the second count unit is greater than or equal to a second threshold; and controlling the imaging optical system so that the focal point adjustment operation is executed in a case where the number of times is greater than or equal to a third threshold before the number of frames is greater than or equal to the second threshold.

4. The method according to claim 3, wherein the reference value is a focal point evaluation value in a state where a predetermined object is in focus.

5. A non-transitory computer-readable medium storing a program for causing a computer to execute an image processing method comprising:

calculating a focal point evaluation value for each of images captured successively by the imaging optical system;

determining whether an amount of change in the calculated focal point evaluation value with respect to a reference value is greater than or equal to a first threshold;

counting a number of times the amount of change in the focal point evaluation value is determined to be greater than or equal to the first threshold;

counting a number of frames;

storing the number of times wherein the number of times is reset in a case where the number of frames counted by the second count unit is greater than or equal to a second threshold; and controlling the focal point adjustment operation of the imaging optical system so that the focal point adjustment operation is executed in a case where the number of times is greater than or equal to a third threshold before the number of frames is greater than or equal to the second threshold.

6. The non-transitory computer-readable medium according to claim 5, wherein the reference value is a focal point evaluation value in a state where a predetermined object is in focus.

* * * * *